SCANNING SIGNAL GENERATOR USING DELAY LINE

Original Filed May 24, 1962 5 Sheets-Sheet 1

Inventor
David E. Wood
by Charles W. Helzer
His Attorney

Inventor
David E. Wood
by Charles W. Helzer
His Attorney

SCANNING SIGNAL GENERATOR USING DELAY LINE

Original Filed May 24, 1962 5 Sheets-Sheet 3

Inventor
David E. Wood
by Charles W. Helzer
His Attorney

SCANNING SIGNAL GENERATOR USING DELAY LINE

Original Filed May 24, 1962 5 Sheets-Sheet 4

Inventor
David E. Wood
by Charles W Helzer
His Attorney

Inventor:
David E. Wood
by Charles W Helzer
His Attorney 3,386,035
SCANNING SIGNAL GENERATOR USING DELAY LINE David E. Wood, Schenectady, N.Y., assignor to General Electric Company, a corporation of New York Original application May 24, 1962, Ser. No. 197,364, now Patent No. 3,243,703, dated Mar. 29, 1966. Divided and this application Nov. 12, 1965, Ser. No. 507,449
1 Claim. (Cl. 328—30)

The present invention relates to a new and improved scanning signal generator using a delay line, and is a division of application Ser. No. 197,364, now Patent No. 3,243,703, filed May 24, 1962, entitled, "Interpolative Scanning Method and Apparatus," D. E. Wood, inventor, assigned to the General Electric Co.

The parent application describes a new and improved method and apparatus for sampling the finite values of a multiplicity of signals and interpolating between the finite values to provide a continuous characteristic output signal which is indicative of the continuous energy level across the spectrum of the multiplicity of signals.

There are a wide number of situations where it is desirable to analyze a complex signal by first separating the complex signal into a number of component signals and subsequently recombining the component signals in such a manner that the characteristics of the complex signal can be identified. For example, in the construction of a language translator or voice vocoder for the bandwidth compression of voice transmission, it is necessary to break the speech wave up into its various frequency components, and subsequently recombine them in a manner to identify the characteristics of the speech wave. Heretofore, the manner in which these separated signals have been sampled or recombined has not been entirely satisfactory because of inadequacies in the methods employed to accomplish the recombination. One of the problems associated with this technique for signal analysis has been the need for a scanning signal generator for accomplishing the desired sampling in an optimum fashion.

It is, therefore, a primary object of the present invention to provide a new and improved scanning signal generator for use with a method and apparatus for separating a complex signal into its various component parts, and scanning the plurality of resulting component signals in a manner to provide an interpolated output signal that is representative of the continuous signal energy level across the spectrum of the complex signal.

In practicing the invention, the method of spectrographic analysis of a complex wave is provided which comprises serially sampling a plurality of separated signal inputs in a manner such that the periods during which successive signal inputs are sampled are overlapping, and subsequently summing the several signal inputs in a manner such that an interpolated output signal is provided which is representative of the continuous energy level across the plurality of signals. In carrying out this method of spectrographic analysis, an apparatus is provided which includes separation means for separating the complex signal into a plurality of known frequency bands. A plurality of scanning electron discharge devices have their input circuits coupled to the separation means, there being at least one electron discharge device for each one of the separated frequency bands. The electron discharge devices all have overlapping periods of conduction and have time variable gain characteristics. The new and improved scanning signal generator is operatively coupled to the scanning electron discharge devices for rendering these devices conductive on a time-sequential basis whereby the scanning electron discharge devices are caused to serially sample the several outputs from the separation means. The apparatus is completed by output circuit means operatively coupled in common to the output of all of the scanning electron discharge devices for developing an interpolated output signal which is representative of the continuous signal energy level across the spectrum of the incoming complex signal.

Other objects, features, and many of the attendant advantages of this invention will be appreciated more readily as the same becomes better understood to the reference to the following detailed description when considered in connection with the accompanying drawings wherein like parts in each of the several figures are identified by the same reference character, and wherein:

FIGURE 4(*b*) is time versus amplitude graph of a typical output signal obtained with the apparatus of FIGURE 4(*a*);

FIGURE 7(*a*) is a graph showing the relation of the gating signal to cut off characteristic of the sampling electron discharge tubes;

FIGURE 7(*b*) is a graph showing the time variable gain characteristic of the sampling electron discharge devices;

Figure 4A:
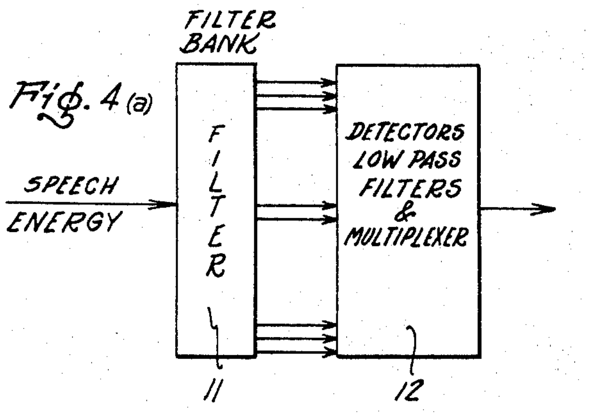
FIGURE 4(*a*) is a functional block diagram of a typical conventional multiplexing apparatus for sampling a plurality of finite values, and deriving an output signal representative of the composite of these finite values.
Figure 4B:
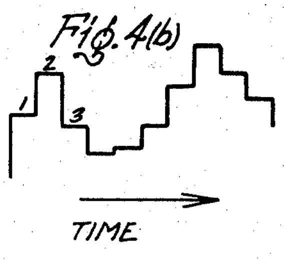

In the analysis of complex waves, such as speech waves, where there are a multiplicity of signal frequencies present in the wave, it has been the practice heretofore to successively scan across the spectrum of the complex wave with a suitable filter bank and multiplexer arrangement to derive a composite output signal representative of the various energy levels of the incoming complex speech wave. Such an arrangement is illustrated schematically in the block diagram of FIGURE 4 wherein the incoming speech energy is applied to a bank of filter elements 11 for separation into a multiplicity of signal frequencies. The filter bank 11 is of conventional construction of the type described, for example, in the textbook entitled, "Visible Speech," by Potter, Kopf and Green. Generally speaking, the outputs of the filter elements provide an approximate representation of the distribution of energy over the frequency range of the speech wave. It is believed clear that the larger the number, and the more closely spaced are the filter elements, then greater is the detail obtainable with the filter bank. One instrument available for this purpose known as sonograph provides fairly detailed spectral cross sections of speech waves by sampling the spectrum in some two hundred or more fine frequency steps. The output of the filter elements represent a plurality of finite values which may then be supplied to a number of detectors shown at 12 that are coupled to low pass filters for time integration, and, in turn, are connected to a suitable multiplexing device. The resultant output signal is a series of interrupted pulses with amplitudes representing the filter outputs such as is shown in FIGURE 4(*b*). From an examination of FIGURE 4(*b*), it can be appreciated that the resultant output signal is a discontinuous function which really does not portray the true character of the incoming complex speech wave supplied to the analyzer.

Figure 1:
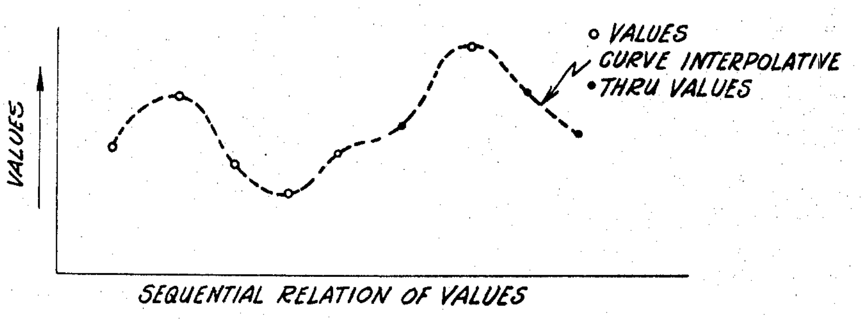
FIGURE 1 is a continuous curve obtained by connecting together a number of finite values with a number of interpolated values, and illustrates the manner in which the present invention is intended to operate.
Figure 2:
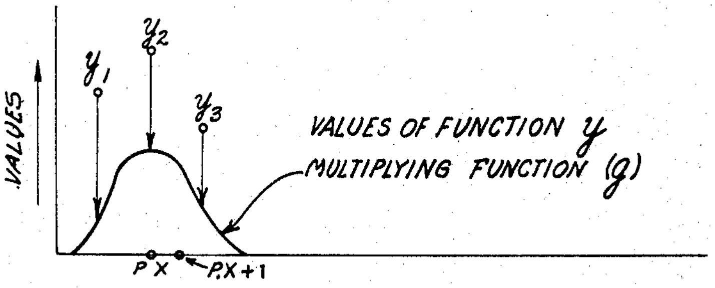
FIGURE 2 is a graph illustrating the manner in which the interpolated values of the curve shown in FIGURE 1 are obtained.

In contrast to the discontinuous signal obtained with the conventional filter-multiplexer systems shown in FIGURE 4, it is desired to obtain a continuous output signal such as the one illustrated in FIGURE 1 of the drawings wherein the small circles on the curve represent finite values obtained from the output of a filter bank, for example, and the solid segments represent the continuous series of values obtained through interpolation. The manner in which these interpolated values are obtained is illustrated in FIGURE 2 of the drawings wherein a multiplying function $g$ is illustrated as a curve, and there are a number of finite values available which lie on this curve, namely, the values $y_1$, $y_2$ and $y_3$. If it is desired to know some point $y_x$, say, half-way between $y_2$ and $y_3$ on the multiplying function $g$, this point could be obtained through interpolation by substracting $y_3$ from $y_2$ and multiplying by one-half. Similarly, points ⅛, ⅕, and ¼ of the way along the multiplying function can be determined in a like manner. Hence, by interpolation, a continuous curve such as that plotted in FIGURE 1 of the drawings is obtained.

Figure 3:
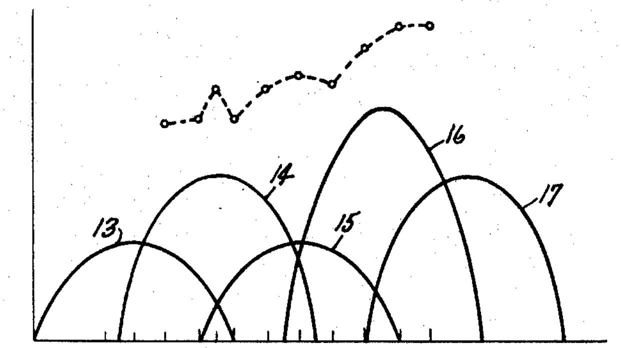
FIGURE 3 represents a series of curves whose values are to be interpolated in a manner in accordance with the present invention.

Another form of interpolated curve obtained by the present invention is illustrated in FIGURE 3 of the drawings. In FIGURE 3, the various curves 13–17 represent the signal outputs of a plurality of filters, for example. It should be noted that the output curves 13–17 all overlap, and preferably overlap to an extent in excess of 90 degrees so that at some points along the time axis, the outputs from at least three filters overlie each other. The dotted curve is formed by joining the points $y_x$, $y_{x+1}$, $y_{x+2}$, etc. represents the interpolated values for the points $p_x$, $p_{x+1}$, $p_{x+2}$, etc. along the time axis. These values can be confirmed by adding the various output curves 13–17 graphically, and illustrates the mode of operation of the present interpolative scanner.

Figure 5:
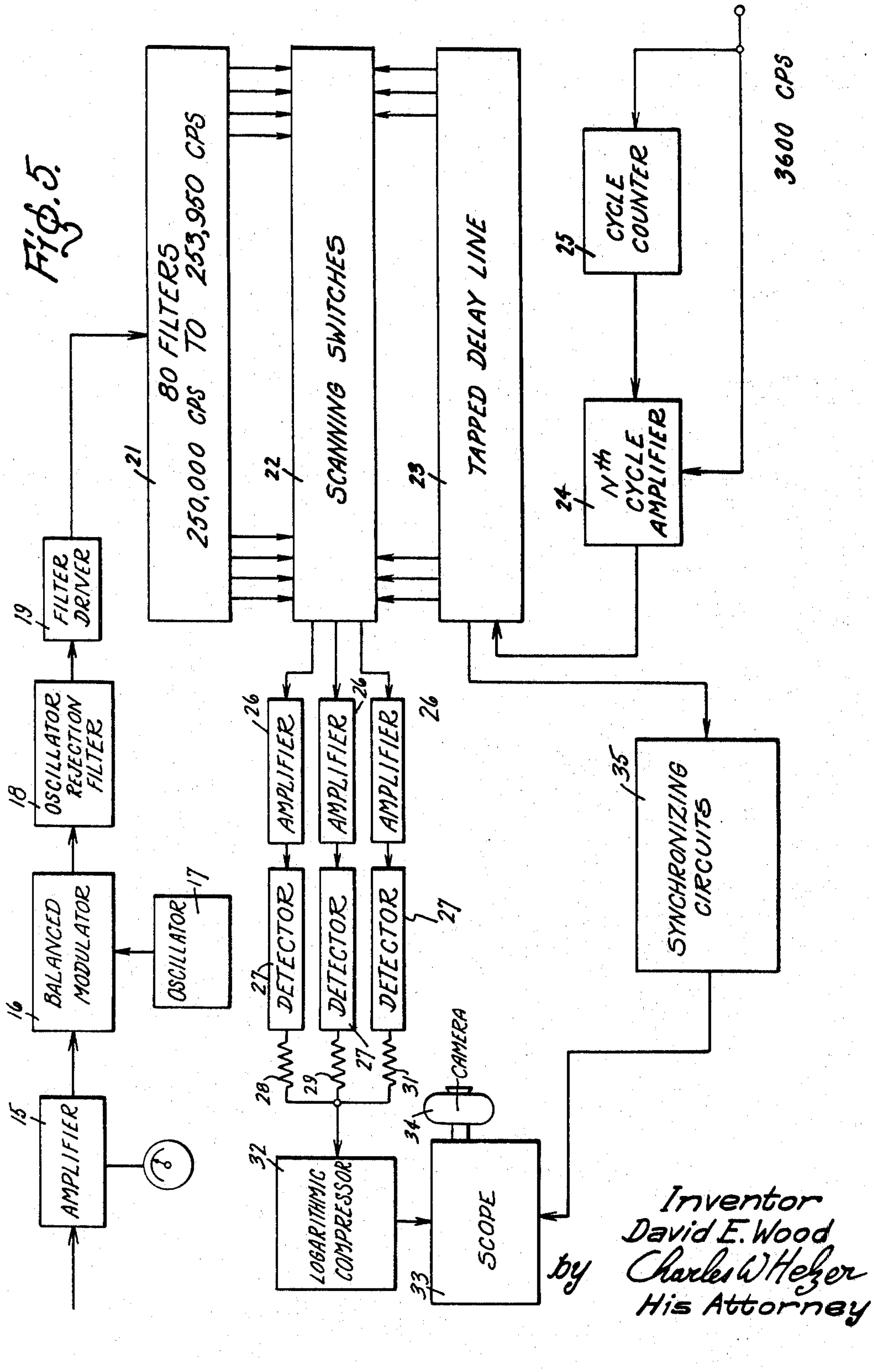
FIGURE 5 is a detailed functional block diagram of an interpolative scanner construction in accordance with the present invention.

The construction of the new and improved interpolative scanner made available by the invention is illustrated in the functional block diagram of FIGURE 5 of the drawings. As shown in FIGURE 5 of the drawings, the incoming complex wave to be analyzed, such as a speech wave, is supplied to the input of an amplifier 15. The amplifier 15 is a conventional audio amplifier such as those described in section 5, paragraph 7 of the Radio Engineers' Handbook by Terman, first edition, fourth impression, published by McGraw-Hill Book Company of New York (1943). Audio amplifier 15 serves to amplify the incoming speech wave and supply the same to a heterodyning stage provided by a balanced modulator 16 having the output from a local oscillator 17 connected to it. The local oscillator 17 may comprise any conventional crystal controlled oscillator such as those described in the above identified Radio Engineers' Handbook, section, 5, paragraph 3. The oscillator 17 is adjusted to provide an output signal frequency of 250 kc. to the balanced modulator 16 in conjunction with the audio frequency speech wave to be analyzed supplied from the audio amplifier 15. The balanced modulator 16 is of the type described in an article entilted, "Single Sideband Exciter Circuits Using a New Beam Deflection Tube" by H. C. Vance appearing in QST, March 1962. The balanced modulator 16 serves to heterodyne the local oscillator frequency with the incoming speech wave, and to supply the mixed output signals to the input of an oscillator rejection filter 18. The rejection filter 18 is a conventional band rejection filter of the type manufactured and sold by the Hill Electronics Engineering Manufacturing Company of Mechanicsburg, Pa. Since the rejection filter 18 is a commercially available item, a further description of its construction is believed unnecessary. Rejection filter 18 serves to reject the local oscillator frequency, and to pass only the upper side band of the mixed output signal supplied thereto from the balanced modulator 16. The upper side band signals passing through rejection filter 18 are supplied to a filter driver circuit 19 which may comprise nothing more than a conventional cathode follower amplifier in combination with a pre-driver, linear amplifier such as described on page 430 of the above referenced Radio Engineers' Handbook.

The signal output from the filter drive 19 is supplied to a filter bank 21 comprised by some eighty crystal filters which are conventional two-crystal band pass filters manumactured and sold by the above-identified Hill Electronics and Engineering Manufacturing Company. The details of construction of the filter bank 21 may vary dependent upon the particular application for which the interpolative scanner is being designed. For speech analysis, it has been determined that for the frequency range from 0 to 4000 cycles per second, a band pass characteristic of about 75 cycles per second is desired, with the centers of the filter elements being spaced 50 cycles apart. The filters are overlapped in this manner to create a nearly equal response of the filter-scanner at all signal frequencies.

The several output signals derived from the filter bank 21 are supplied to a scanning switch 22 whose construction and operation will be described more fully hereinafter. For the present purpose, however, it is believed adequate to point out that the scanning switch 22 is scanned by a signal supplied from a tapped delay line 23 serially in a manner such that the signal outputs from adjacent filter elements of the filter bank 21 are sampled in time sequence. This time sequence sampling of the scanning switches is achieved by reason of a gating signal which travels down the tapped delay line 23 to sequentially render the scanning switches 22 conductive thereby sampling the outputs of the respective filter elements connected thereto. The gating signal traveling down the tapped delay line 23 is supplied from an *n*th cycle amplifier 24 that in turn is energized from an outside source of 3600 cycles per second oscillations, and is controlled by a cycle counter 25. The cycle counter 25 serves to activate *n*th cycle amplifier circuit to emphasize the *n*th cycle so that it functions as a gating signal in traveling down a tapped delay line 23. The output signal derived from the outputs of the respective filter elements of filter bank 21 by the scanning switches 22 are supplied through three output channels to amplifiers 26 and detectors 27 and are applied across summing resistors 28, 29, and 31 where they are summed together. The summed output signals appearing across the resistors 28, 29, and 31 are then applied to a logarithmic compressor 32 where their amplitude range is compressed, and the compressed signals are supplied to a conventional cathode ray oscilloscope 33 for presentation. The screen of oscilloscope 33 may be viewed by a Land Polaroid camera 34 for taking pictures of the resulting spectrograms appearing on the screen of the cathode ray oscilloscope 33. The cathode ray oscilloscope 33 is, of course, energized from suitable synchronizing circuits 35 that in turn are gated on by the *n*th cycle signal coming from appropriate taps on the delay line 23 in order that the time base of the sweep circuits of the oscilloscope will be synchronized with the sweeping of the scanning switches by the *n*th cycle traveling down the tapped delay line 23. As will be explained more fully hereinafter, the resultant output signal obtained across the summing resistors 28, 29, and 31 is a time base spectrogram which is in effect an interpolated output signal representative of the continuous signal energy level across the spectrum of the incoming speech wave or other complex signal applied to the input of the amplifier 15.

Figures 6, 7A, 7B:
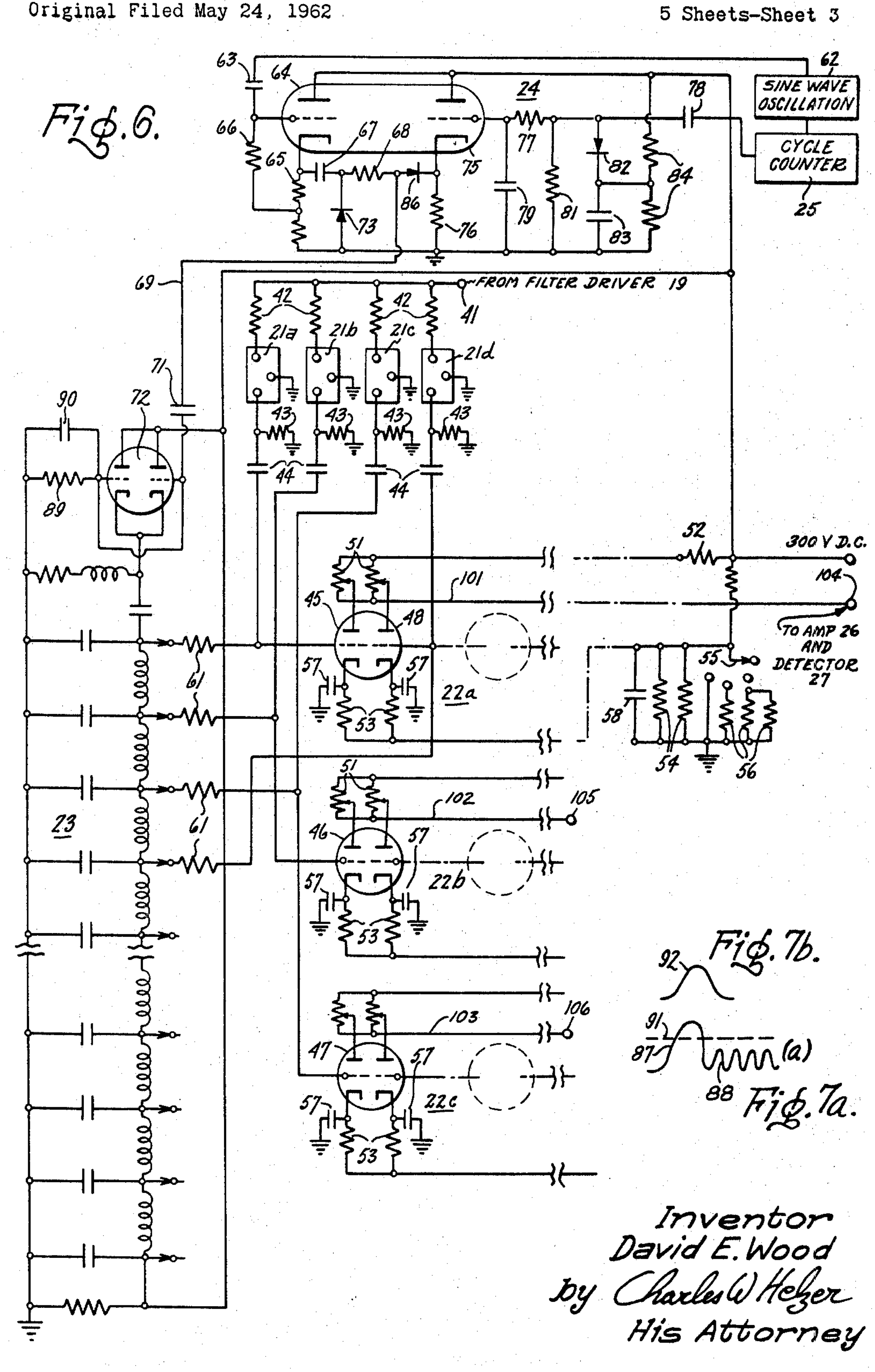
FIGURE 6 is a detailed schematic circuit diagram of a portion of the interpolative scanner shown in FIGURE 5, and illustrates the construction of a delay line gating circuit used with a plurality of sampling electron discharge devices to obtain interpolation of plurality of finite signals being sampled.
Figure 8:
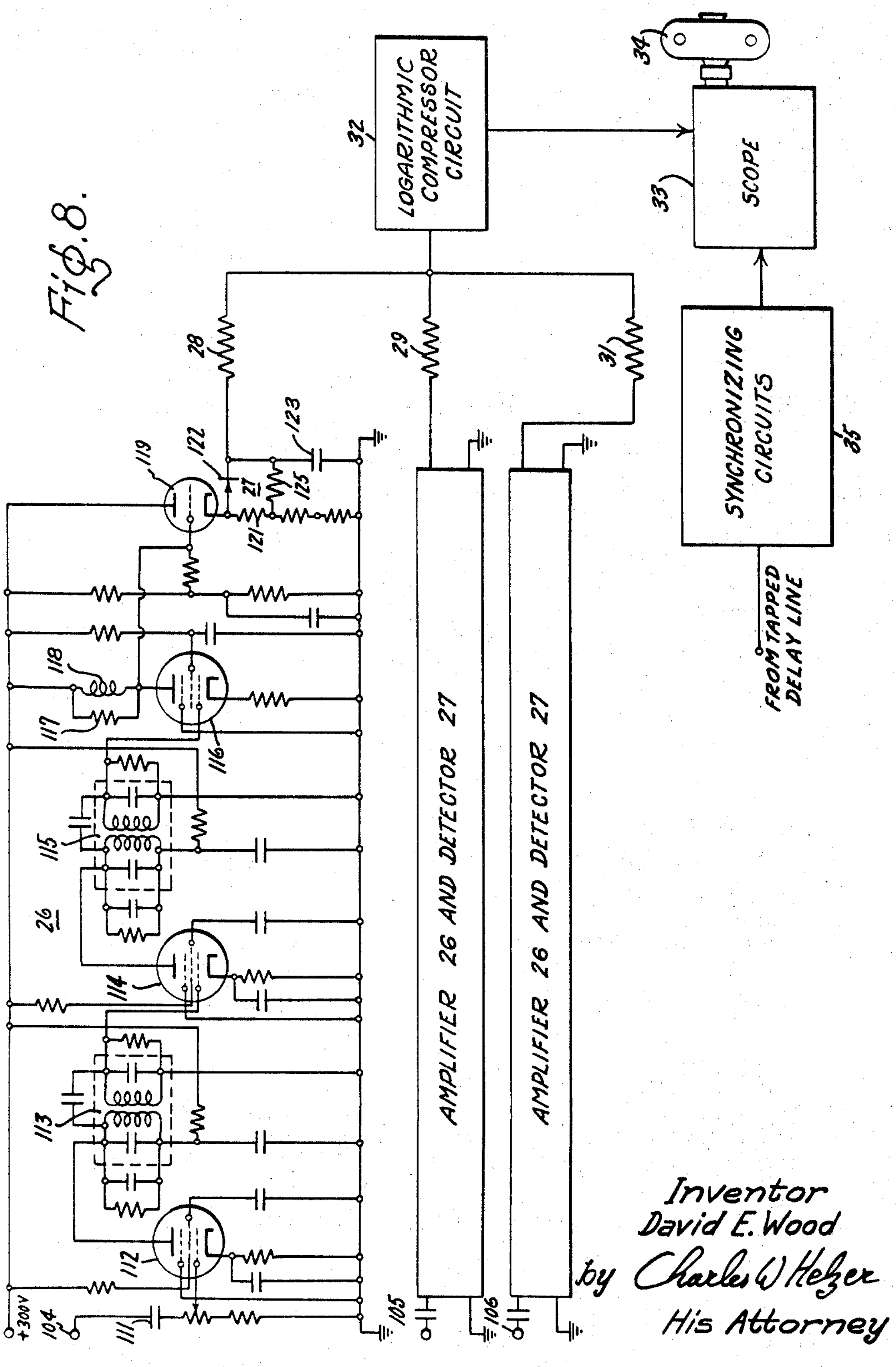
FIGURE 8 is the schematic circuit diagram of an output amplifier and detector used with the sampling electron discharge devices shown in the circuit diagram of FIGURE 6.

The circuit construction of the scanning switches 22 and tapped delay line 23 is shown in FIGURE 6 of the drawings. Referring to FIGURE 6, the heterodyned complex wave supplied from the filter driver 19 is applied to the input terminal 41, and is coupled through respective current limiting resistors 42 to the input of all of the crystal filter elements 21. Because it is believed redundant to show all eighty of the crystal filter elements, only the first four such elements are illustrated, and it is believed that the construction of the remainder of the circuit will be obvious from the pattern developed in explaining the connections of the first four filter elements. The signals appearing across the output load resistors 43 of each of the filter elements 21 are supplied through coupling capacitors 44 to the control grid of a respective, associated triode electron discharge device 45 in the case of the first filter 21(*a*), 46 in the case of the second filter 21(*b*), 47 in the case of the third filter 21(*c*), and 48 in the case of the fourth filter 21(*d*), and so on down the line throughout the 80 different filter elements comprising the filter bank. It should be noted that the two triode sections 45 and 48 comprise a duo-triode tube since fabrication of the circuit in this manner lends itself to economy. Further, it should be noted that the scanning switch is divided into three channels 22(*a*), 22(*b*), and 22(*c*). Each of the channels is identical in construction and is comprised of a number of duo-triode tubes such as 45, 48, there being approximately 13 such tubes in each of the channels 22(*a*), 22(*b*), or 22(*c*). The sequence of connections of the filters 21 to the triode sections with the duo-triode tubes is that the first three filters are connected to the first triode section in each of the respective channels 22(*a*), 22(*b*), and 22(*c*), the second set of three filters, namely, the fourth, fifth, and sixth filter of the bank, are connected to the second triode sections in each of the component channels, the third set of three filters, namely, the seventh, eighth, and ninth filters are connected to the third set of triode sections in each of the component channels and so on through the three channels to complete connections to all eighty triode sections. Each of the triode sections 45, 46, 47, 48, and so on through the list has its anode connected through variable plate load resistor 51 to the positive terminal of a 300 volt source of direct current plate potential by way of a dropping resistor 52. The variable plate load resistors are set to equalize the gains of the various triode sections with respect to each other. The cathodes of the triode sections 45, 46, etc. are connected through cathode biasing resistors 53 and 54 to ground, and to the movable contact of a selector switch 55 that in turn has its fixed contacts connected through different valued additional biasing resistors 56 to ground for a purpose that will be appreciated more fully hereinafter. The cathode biasing resistors 53 are bypassed to ground for radio frequencies through bypass capacitors 57, and the biasing resistors 54 and 56 are bypassed to ground for radio frequencies by a capacitor 58. The triode sections 45 connected in this manner are adapted to operate as self-biased linear amplifiers wherein the self-bias and hence, the conductance of the amplifiers, is controlled by the bias adjustment switch 55 to provide any desired conductance characteristic for the device as will be explained more fully hereinafter.

In addition to having their control grids connected to the output of the filter elements 21, all of the triode electron discharge devices 45, 46, etc. have their control grids connected through suitable current limiting resistors 61 to a respective tap-off point on the tapped delay line 23. The tapped delay line 23 is excited from a sine wave oscillator 62 having a frequency of 3600 cycles per second. The output from the sine wave oscillator 62 is supplied to the cycle counter 25 which is of conventional construction, and is also supplied through a coupling capacitor 63 to the control grid of a triode section 64 of a duo-triode. The duo-triode section 64 is connected as a conventional cathode follower amplifier wherein the anode electrode of the triode section is connected directly to the 300 volt direct current power supply, and its cathode is connected through suitable load resistor arrangement 65 to ground. A grid biasing resistor 66 is interconnected between a mid tap point on the cathode load resistor 65 and the control grid of the triode section to provide proper operating bias to the triode section. The sine wave oscillatory signal applied to the triode section 64 appears across the cathode load resistor 65, and is supplied through a coupling capacitor 67, and current limiting resistor 68 across a conductor 69 and coupling capacitor 71 to the control grids of a cathode follower driver amplifier 72. The minimum sine wave voltage is set at ground potential by diode 73 which is connected between the juncture of capacitor 67 and resistor 68, and ground. By this arrangement, the sine wave oscillatory signal generated by the oscillator 62 is coupled to the cathode follower driver amplifier 72.

To assure proper scanning of the scanning electron discharge devices 45, 46, etc., the *n*th cycle enhancement circuit 24 is provided which serves to enhance the amplitude of every *n*th cycle of the sine wave oscillatory signals supplied from the oscillator 62. This *n*th cycle enhancement circuit 24 is comprised by a duo-triode section 75 which is likewise connected as a cathode follower amplifier. The duo-triode section 75 has its anode connected directly to the 300 volt DC power supply, and its cathode connected through a suitable load resistor 76 to ground. The control grid of duo-triode section 75 is connected through a current limiting resistor 77, and coupling capacitor 78 to the output of cycle counter 25. The current limiting resistor 77 in conjunction with a capacitor 79, and a resistor 81 comprise a grid biasing circuit for biasing the duo-triode section 75 to a desired point on its operating characteristic. Current through the duo-triode section 75, however, is limited by a clamping diode 82 which is connected to the juncture of a voltage dividing resistor 84 and charging capacitor 85 that serve to clamp the potential of the control grid of the duo-triode 75 to a value determined by the voltage divider 84. In this fashion the triode section 75 is set with its current equal to zero until the *n*th cycle is detected.

In operation, the cycle counter 25 will count up to every *n*th cycle of the sine wave oscillatory signal delivered from the oscillator 62, and upon the occurrence of the *n*th cycle will deliver a gating pulse to the duo-triode section 75. Upon this occurrence, the duo-triode section is rendered conductive producing a large voltage across its cathode load resistor 76 which is coupled through a blocking diode 85, conductors 69 and 71, to the cathode follower driver amplifier 72. As a result, every *n*th cycle of oscillation will be enhanced in amplitude by removal of resistor 76 to keep from loading the sine wave in the manner illustrated in FIGURE 7(*a*) of the drawings wherein the *n*th cycle of operation is shown at 87, and a normal operating cycle of the sine wave oscillatory signal is illustrated at 88.

The cathode follower driver amplifier 72 has a self-biasing circuit comprised by a resistor 89 and capacitor 90 connected to its control grid, and has the tapped delay line 23 connected as its cathode load resistor. By this arrangement, the cathode follower driver amplifier serves to start the oscillatory signal supplied thereto from the *n*th peak amplifier 24 at the input end of the tapped delay line 23. The tapped delay line 23 comprises a conventional capacitor-inductor delay line of the constant K type whose mid-tap points are connected through the current limiting resistor 61 to appropriate ones of the control grids of the scanning electron discharge devices 45, 46, 47, etc. Upon being introduced into the input end of the tapped delay line 23, an *n*th peak, such as 87, will travel down the length of the tapped delay line 23 at a rate determined by the parameters of the inductors and capacitors out of which the tapped delay line is fabricated. The length of delay designed into the tapped delay line is related to which peak is selected as the *n*th peak so that all electron discharge devices 45, 46, 47, etc. are allowed time to operate before starting a new scanning cycle. This delay period is also related to the rate at which it is desired to scan or sample the output of the filter bank by the scanning electron discharge devices 45, 46, 47, etc. As will be pointed out more fully hereinafter, this scanning rate will be determined by the sampling rate required to keep up with changes in the source signals (filter outputs). Experience has indicated, however, that it is desirable at times to use every tenth cycle of a 3600 cycle sine wave for scanning purposes. This would require that for every tenth cycle to travel the length of the delay line before the next tenth cycle is introduced into it, the time delay of the entire line should be on the order of about 1/360 second. It should be noted that this value is cited as exemplary only, and that the invention is in no way limited to requiring a delay of this order.

The manner in which every *n*th cycle is caused to gate on or control the gain the sampling electron discharge tubes 45, 46, 47, etc., is best illustrated in FIGURE 7(*a*) of the drawing. If it is assumed that the portion of the sine wave shown at 87 constitutes the *n*th cycle, and the self-biasing circuits comprised by the resistors 53 and capacitors 57 together with the adjusting resistors 56 are set to render the electron discharge devices 45, 46, 47, etc. conductive at the level indicated by the dotted line 91, then the electron discharge devices 45, 46, 47, etc. will have a time variable gain characteristic such as is illustrated by the curve 92 in FIGURE 7(*b*). This time variable gain characteristic can of course be adjusted by switching in the appropriate adjusting resistor 56 with the selector switch 55 to thereby control the degree or amount of overlap of the conduction periods of the scanning electron discharge tubes 45, 46, 47, etc. connected to adjacent filter elements 21. The effect of such adjustment is best appreciated in connection with FIGURE 3 of the drawings.

Referring to FIGURE 3, assume, for example, that the curve illustrated by the curve 14 represents the output signal produced by the scanning electron discharge tube 45, the curve 15 represents the output signal produced by the scanning electron discharge tube 46, and the curve 16 represents the output signal produced by the scanning electron discharge tube 47. Since the electron discharge tubes 45, 46, 47, etc. are connected to adjacent filter elements, then it can be appreciated that by varying the self-biasing level 91, the point at which each of these tubes will be rendered conductive, and hence, the amount or degree of overlap of the curves 14, 15, and 16 can be appropriately varied. This will also vary the shape of the characteristic output curve and in this manner, influence the resultant interpolated output curve represented by the dotted line values $y_x$, $y_{x+1}$, $y_{x+2}$, etc., shown in FIGURE 3. In order to derive this interpolated output signal, the several output signals from the several scanning electron discharge devices 45, 46, 47, etc. are supplied across respective output conductors 101, 102, and 103. Conductor 101 supplies the output signals from all of the electron discharge devices connected in channel 22(*a*) and is connected to an outut terminal 104, conductor 102 connects together all of the outputs from the electron discharge devices connected in channel 23, and supplies these to an output terminal 105, and the conductor 103 connects together all of the output signals from the scanning electron discharge devices in channel 22(*c*) to an output terminal 106. The manner in which the output signals from the three channels 22(*a*), 22(*b*), and 22(*c*) appearing at the output terminals 104, 105, and 106, respectively, are combined to provide the desired interpolated output signal of FIGURE 3 is best illustrated in the circuit diagram of FIGURE 9.

Figure 9:
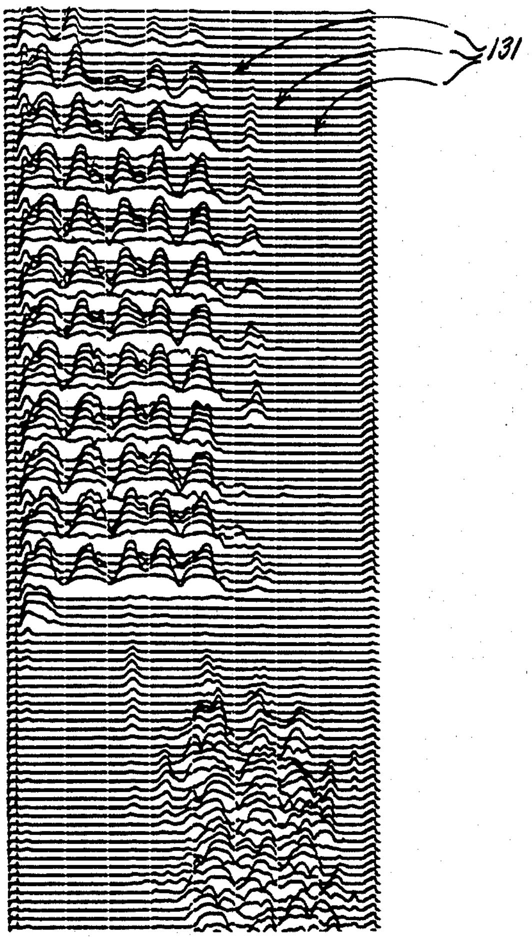
FIGURE 9 is a typical series of time vs. amplitude graphs obtained with the interpolative scanner of the present invention.

The output signals from the several channels 22(*a*), 22(*b*), and 22(*c*) of scanning electron discharge devices supplied to the terminals 104, 105, and 106, are applied to separate amplifiers 26 and detectors 27 for each of the three channels, and the output of the three amplifier and detector channels are connected across the summing resistors 28, 29, and 31, respectively as illustrated in the functional block diagram of FIGURE 5, and as shown in FIGURE 9. The reason for separating the outputs of adjacent sampling devices into three channels is to get the signals separated until the R.F. phase relations have been eliminated by the envelope detectors. Because the amplifier 26 and detector 27 channels are identical in construction and operation, only one such channel will be described in detail with relation to FIGURE 9.

The incoming signals supplied from the first channel 22(*a*) of scanning electron discharge devices are supplied through the input terminal 104, and through a coupling capacitor 111 to the control grid of a pentode electron discharge tube 112. The pentode electron discharge tube 112 comprises a part of a tuned amplifier circuit such as is described in section 5, paragraph 19 of the above referenced Radio Engineers' Handbook. The tuned amplifier 112 is conventional in every respect, and includes the normal biasing voltage connections through proper biasing resistors and radio frequency bypass capacitors. The outputs of amplifier 112 is supplied to a tuned coupling transformer 113 whose primary is connected to the anode electrode of the pentode electron discharge tube 112, and whose secondary winding is connected to the control electrode of a second pentode electron discharge tube 114. The second pentode electron discharge tube 114 likewise comprises a part of a tuned amplifier circuit similar in construction to the tuned amplifier 112, and has its output connected through a second tuned coupling transformer 115. The primary winding of the tuned coupling transformer 115 is connected to the anode electrode of the pentode electron discharge tube 114, and the secondary winding of coupling transformer 115 is connected to the control electrode of a third pentode electron discharge tube 116. The third pentode electron discharge tube 116 comprises a part of a power amplifier output stage, and has its anode electrode connected through a plate load resistor 117 connected in parallel with an inductor 118 to the 300 DC power supply. The plate load resistor 117 of power amplifier 116 is connected to the control grid of a triode electron discharge tube 119. Triode 119 comprises a part of a cathode follower amplifier output stage having a cathode load resistor 121 connected to the detector 27. The detector 27 comprises a diode rectifier 122 and smoothing capacitor 123 connected to the summing resistor 28. A part of the cathode load resistor 21 of cathode follower 119 is bypassed by a bypass resistor 124 connected in parallel with the diode rectifier 122. By reason of this connection, a small circulating current is caused to flow through the diode rectifier 122 so as to bias it well up on its conduction characteristic, keeping it in a ready condition for rectifying the intermediate frequency signals supplied to it from the cathode load resistor 121 of cathode follower 119.

In operation, the scanning signals appearing across the outputs of the respective scanning electron discharge devices 45, 48, etc. in channel 22(*a*) of the scanning switches are supplied through the input terminal 104 to the three-stage tuned amplifier comprised by the pentode tubes 112, 114, and 116, in order to eliminate the scanning signal frequency in favor of the desired R.F. signals frequencies representing the outputs of the filters. The amplified signals are then applied to the cathode follower 119 and rectified by rectifier 122 in a manner such that the envelope of the output signal from a particular filter element being sampled appears across the summing resistor 128. The same process is carried out in each of the amplifier and detector channels associated with the switching tube channels 22(*b*) and 22(*c*) so that their output signals appear across the summing resistors 29 and 31. Referring now to FIGURE 3 of the drawings, it can be appreciated that the summing together of the output signals from any three adjacent filter elements of the filter bank serves in effect to interpolate the values of the signal energy level at any point in the spectrum of a complex wave applied to the input of the system. Accordingly, at the output of the summing resistors 28, 29, and 31, an interpolated output signal such as is shown by the dotted line in FIGURE 3 of the drawings, will appear.

The interpolated output signal derived in the above manner is applied to a logarithmic compressor 32 where in effect its amplitude range is compressed sufficiently to enable the signal to be presented on a conventional cathode ray oscilloscope 33. The logarithmic compressor circuit 32 is a conventional circuit employing a remote cutoff pentode tube to provide logarithmic compression of an input signal supplied thereto. Such circuits have long been used in the circuit art, and are not believed to require detailed description. In addition to the output from the logarithmic compressor circuit 32, the cathode ray oscilloscope 33 has synchronizing signals supplied thereto from the synchronizing circuit 35 which is, in turn, controlled from the tapped delay line shown in FIGURE 6. In this manner, it is assured that the presentation appearing on the cathode ray oscilloscope 33 will be synchronized in time with the scanning of the filter bank by the scanning switches as the enhanced *n*th cycle travels down the tapped delay line 23. By taking pictures of successive scans appearing across the face of the cathode ray oscilloscope 33 with the Polaroid-Land camera 34, a spectrogram may be produced which appears as shown in FIGURE 10 of the drawings wherein frequency is plotted as the abscissa, and amplitude as the ordinate, and time is shown by the progression of scans extending in the vertical direction. If desired, a number of frequency markers such as shown at 131 may be recorded on the spectrogram to facilitate its interpretation. From an examination of FIGURE 10, it can be appreciated that a complete and continuous interpolated spectrogram of the energy level content in the speech wave being analyzed is obtained.

From the foregoing description, it can be appreciated that the invention makes available a new and improved interpolative scanning method and apparatus for separating a complex signal into its various component parts, and scanning the plurality of component signals in a manner to provide an interpolated output signal which is representative of the continuous signal energy level across the spectrum of the incoming complex signal.

Having described one embodiment of a new and improved method and spectrographic apparatus constructed in accordance with the invention, it is believed obvious that other modifications and variations of the invention are possible in the light of the above teachings. It is therefore to be understood that changes may be made in a particular embodiment of the invention described which are within the full intended scope of the invention as defined by the appended claim.

What I claim as new and desire to secure by Letters Patent of the United States is:

1. A scanning signal source comprising a tapped delay line having a plurality of tap-off points along its length, a source of oscillatory signals effectively coupled to said delay line, an *n*th cycle counter coupled to said source of oscillatory signals, and an *n*th cycle emphasizing circuit coupled to said delay line and to said source of oscillatory signals and controlled by said *n*th cycle counter for emphasizing every *n*th cycle of said oscillatory signal supplied to the delay line where *n* is any number greater than one and not exceeding the frequency of the source of oscillatory signals.

No references cited.

ARTHUR GAUSS, *Primary Examiner.*

S. D. MILLER, JR., *Assistant Examiner.*